(12) United States Patent
Gesik

(10) Patent No.: US 7,997,024 B2
(45) Date of Patent: Aug. 16, 2011

(54) MAGNETIC FISHING LURE HOLDER

(76) Inventor: John S. Gesik, Ada, MI (US)

( * ) Notice: Subject to any disclaimer, the term of this patent is extended or adjusted under 35 U.S.C. 154(b) by 333 days.

(21) Appl. No.: 12/430,289

(22) Filed: Apr. 27, 2009

(65) Prior Publication Data

US 2010/0269400 A1 Oct. 28, 2010

(51) Int. Cl.
*A01K 97/06* (2006.01)
(52) U.S. Cl. .......................... 43/57.1; 43/54.1
(58) Field of Classification Search .................. 43/57.1, 43/54.1, 57.3
See application file for complete search history.

(56) References Cited

U.S. PATENT DOCUMENTS

| | | | | |
|---|---|---|---|---|
| 1,543,120 | A | * | 6/1925 | Mathias et al. ............... 43/57.1 |
| 1,900,035 | A | * | 3/1933 | Beck ............................... 43/57.1 |
| 2,235,914 | A | * | 3/1941 | Beck ............................... 43/57.1 |
| 2,497,188 | A | * | 2/1950 | Schindler ....................... 43/57.1 |
| 2,597,601 | A | * | 5/1952 | Sherman ........................ 43/57.1 |
| 2,831,289 | A | * | 4/1958 | Klinghoffer .................... 43/57.1 |
| 3,680,750 | A | | 8/1972 | Franco |
| 4,020,584 | A | | 5/1977 | Michal |
| 4,033,648 | A | | 7/1977 | Lopez-Cepero |
| 4,073,085 | A | | 2/1978 | Stremeckus |
| 4,186,511 | A | | 2/1980 | Slacter |
| 4,281,470 | A | | 8/1981 | Anderson |
| 4,375,137 | A | | 3/1983 | Chitwood |
| 4,405,108 | A | | 9/1983 | Muirhead |
| 4,604,822 | A | * | 8/1986 | Christenberry ................ 43/57.1 |
| 4,697,379 | A | | 10/1987 | McPhaul |
| 4,742,640 | A | * | 5/1988 | Moore ............................ 43/57.1 |
| 4,802,580 | A | | 2/1989 | Andersen |
| 4,826,059 | A | | 5/1989 | Bosch et al. |
| 4,942,691 | A | | 7/1990 | Hwang |
| 5,011,102 | A | * | 4/1991 | Kiefer ............................ 248/37.3 |
| 5,080,230 | A | | 1/1992 | Winnard |
| 5,095,645 | A | | 3/1992 | Borawski |
| D328,544 | S | | 8/1992 | Salazar |
| 5,137,158 | A | * | 8/1992 | Brockway ................. 211/106.01 |
| 5,182,878 | A | | 2/1993 | Clark |
| 5,410,836 | A | | 5/1995 | Hardy |
| 5,501,342 | A | | 3/1996 | Geibel |
| 5,526,927 | A | | 6/1996 | McLemore |
| 5,743,394 | A | | 4/1998 | Martin |
| D416,732 | S | | 11/1999 | Hampshire |
| 5,983,556 | A | | 11/1999 | Zaloga |
| 6,023,877 | A | | 2/2000 | Mueller et al. |
| 6,154,929 | A | * | 12/2000 | Dwyer ........................... 16/422 |

(Continued)

OTHER PUBLICATIONS

Du-Bro Pro Series 6" Stik-It t.m. Jig & Lure Holder, shown at website: http://www.shopatron.com/product/part_number=1201/101.2.314.393.0.0.0; dated Feb. 22, 2009; 2 pgs.
BoatMates Hook Rac, shown at website: http://www.basspro.com/webapp/wcs/stores/servlet/Product_10151_-1_10001_37978?cmCat=CROS...; dated Feb. 22, 2009; 1 pg.

(Continued)

*Primary Examiner* — Christopher P Ellis
(74) *Attorney, Agent, or Firm* — Price Heneveld LLP

(57) ABSTRACT

A fishing lure holder apparatus adapted for attachment to a fishing boat includes an elongated frame with first and second flanges. The fishing lure holder also includes spaced-apart magnetic holders positioned in the first and second flanges, some for magnetically retaining hooks of fishing lures with a remainder of the first fishing lures hanging downward, some also generating a magnetic field thereabove for magnetically retaining fishing hooks above the flange. One set of magnetic holders also generates a magnetic field for magnetically retaining a fishing pliers tool. The apparatus also includes holes indicating a position of the magnetic holders, and for marking a position of the embedded magnets, which can't otherwise be seen.

12 Claims, 4 Drawing Sheets

U.S. PATENT DOCUMENTS

| | | |
|---|---|---|
| 6,516,555 B2 | 2/2003 | Buzzell |
| 6,763,632 B1 | 7/2004 | Exby |
| 7,478,500 B1 | 1/2009 | Pollock et al. |
| 2008/0060204 A1 | 3/2008 | Chen |
| 2008/0110078 A1* | 5/2008 | Kuhn et al. .................... 43/54.1 |

OTHER PUBLICATIONS

Deep Blue Marine 10" Acrylic Lure Rack, shown at website: http://www.diguniverse.com/MARINE-AND-RECREATION-PRODUCTS/FISHING-WATERSPOR...; dated Feb. 22, 2009; 2 pgs.

* cited by examiner

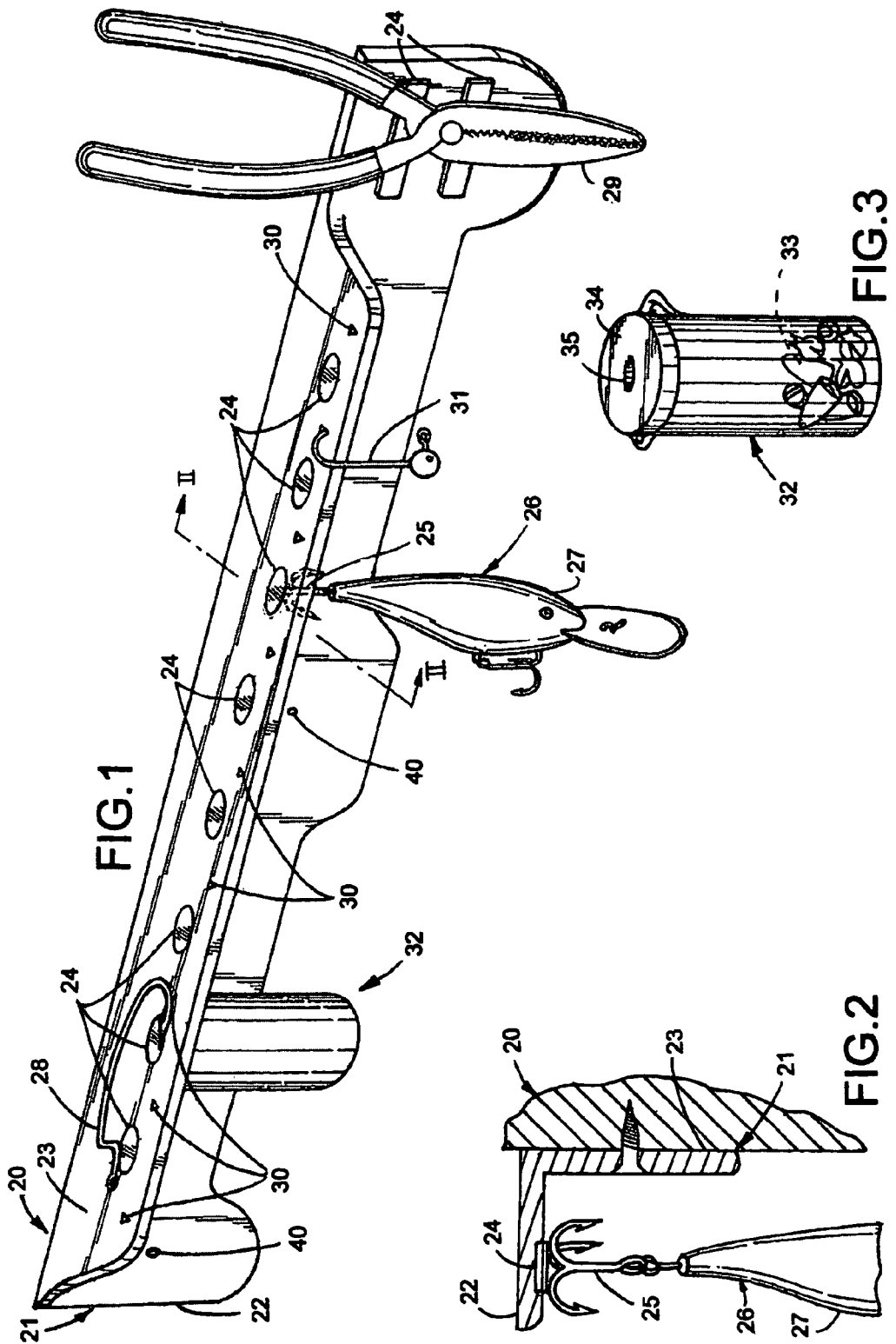

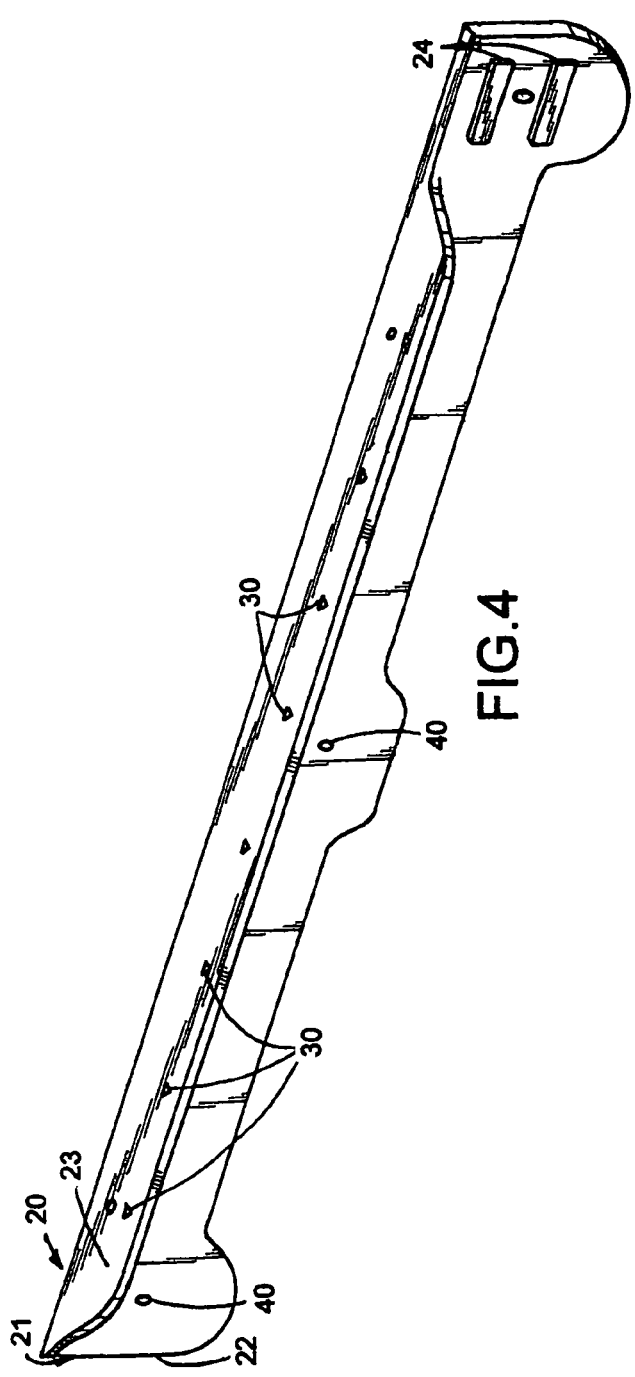
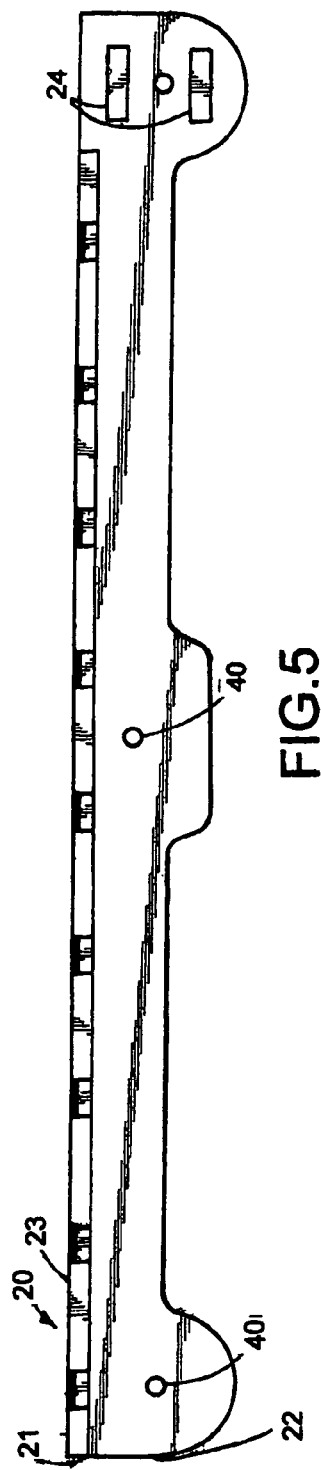
FIG. 4
FIG. 5

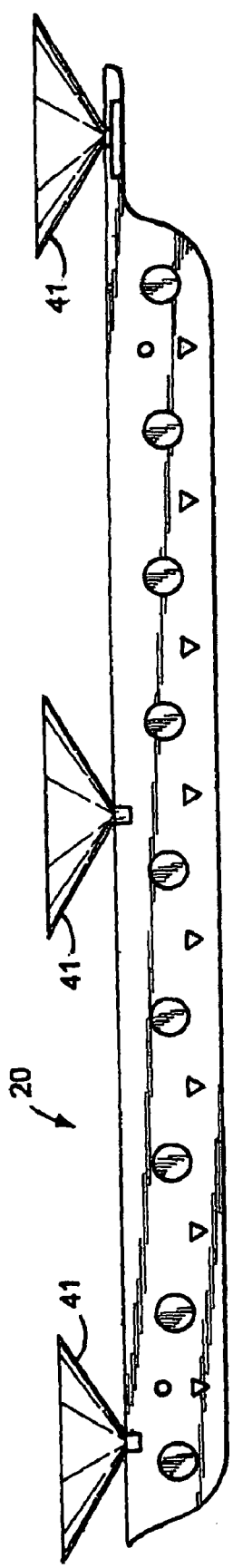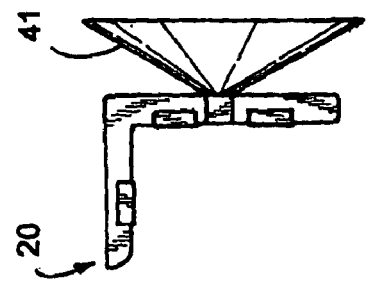

MAGNETIC FISHING LURE HOLDER

BACKGROUND

The present invention relates to a fishing lure holder adapted to hold fishing lures safely but in a visible and easily accessible way.

Fishermen often change lures and hence want ready access to their lures . . . and if possible, they want to do so without having to bend over and dig through a tackle box every time they want to change lures. In fact, anglers often preselect their "top" two to eight lures consistent with their fishing strategy of the day at a start of their day. However, the hooks of lures are sharp, and hooking one's clothes or fingers (or other flesh) is a constant problem, particularly when several lures are pre-selected and separated for quick visual access. Hence, improvement is desired over known systems in terms of physical accessibility, visibility, number and density of storage locations, and safety.

Some tackle boxes and also clothing-attached lure holders incorporate magnets for holding fishing lures. However, known tackle boxes and lure holders, by necessity and also by design, are closable, such that visual and physical access is often not good. Further, they quickly become disheveled and unorganized . . . especially as a boat moves and sways with wave motion and with people movement within the boat. Dropped lures are also a problem, since the lures roll around on a bottom of the boat, or fall into crevices, or they hook on the boat's carpet or floor covering (or other things on the floor). A lure holding system is desired for boats that holds lures for easy visual access, easy physical selection/access, and that is designed for safe use without fear of hooking and injuring one's self or damaging clothing.

SUMMARY OF THE PRESENT INVENTION

In one aspect of the present invention, a fishing lure holder apparatus adapted for attachment to a vertical surface of a fishing boat hull, console, or seat includes an elongated frame with first and second flanges, one of the first and second flanges extending vertically and being adapted for attachment to the vertical surface, and another of the first and second flanges extending generally horizontally when the frame is mounted to the vertical surface. The fishing lure holder also includes spaced-apart magnetic holders positioned in the first and second flanges. Several of the magnetic holders generate a magnetic field therebelow for magnetically retaining magnetically-responsive hooks of first fishing lures with a remainder of the first fishing lures hanging downward. At least one of the magnetic holders also generates a magnetic field thereabove for magnetically retaining fishing hooks thereon, and at least one magnetic holder also generates a magnetic field facing sideways for magnetically retaining a fisherman's tool. The apparatus also includes markers indicating a position of the magnetic holders.

In another aspect of the present invention, a container is provided for holding non-magnetic fishing items on an apparatus as defined above. The container has a magnetically-responsive top for magnetic attachment to one of the magnetic holders, one of the container and top having an opening for removing selected ones of the non-magnetic fishing items.

In another aspect of the present invention, a fishing lure holder apparatus for attachment to a boat hull includes an elongated frame with a cross section defining at least one first member adapted for attachment to a boat and a horizontal flange extending generally horizontally when the frame is mounted to the boat hull. The apparatus also includes spaced-apart magnetic holders positioned in the horizontal flange that generate magnetic fields below the horizontal flange for magnetically retaining magnetically-responsive hooks of first fishing lures with a remainder of the first fishing lures hanging downwardly. The magnetic holders have sufficient magnetic strength to securely retain the hooks even if the first fishing lures are bumped or the boat is shaken from waves, but the magnetic holders are also configured to release an accidentally engaged one of the first fishing lures prior to the engaged hook piercing into a fisherman or his clothing. Apertures are located in the second flange for both engaging hooks of second fishing lures to hold the second fishing lures, and also for indicating a general position of the magnetic holders.

These and other aspects, objects, and features of the present invention will be understood and appreciated by those skilled in the art upon studying the following specification, claims, and appended drawings.

BRIEF DESCRIPTION OF DRAWINGS

FIG. 1 is a perspective view of a fishing lure holder apparatus, including first fishing lures with hooks magnetically held by several of the embedded magnetic holders, and including a container with a magnetic top for holding non-magnetic fishing items, such as lead weights, and holding a fisherman's pliers tool for removing fishing hooks from hooked fish.

FIG. 2 includes a cross section taken along line II-II in FIG. 1.

FIG. 3 is a perspective view of the container with a magnetic-responsive top shown in FIG. 1.

FIG. 4 is a perspective view similar to FIG. 1 but with less items attached thereto.

FIG. 5 is a front view of FIG. 4.

FIGS. 6-7 are top and side views of a first modified fishing lure holder apparatus.

DETAILED DESCRIPTION OF PREFERRED EMBODIMENTS

Figure 8:
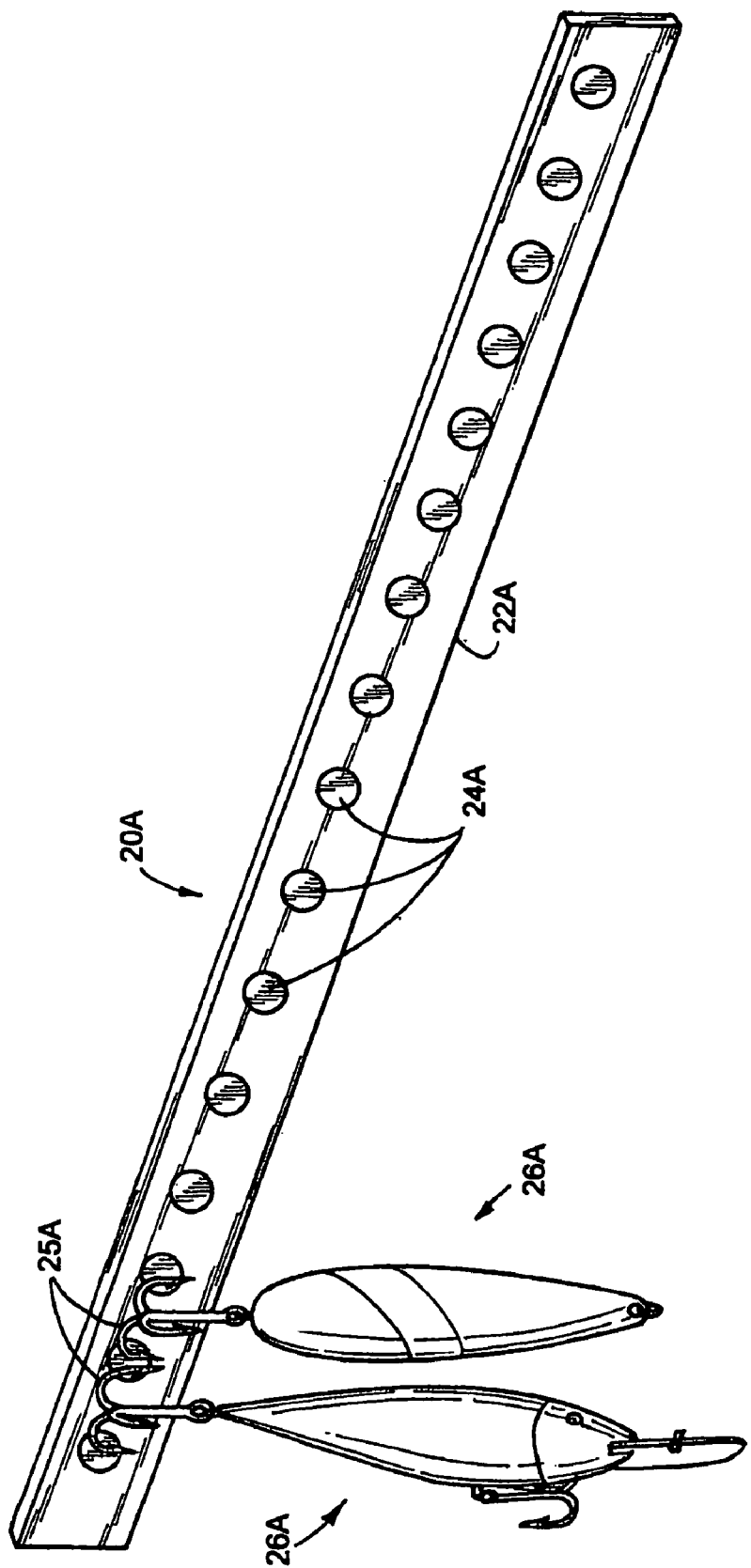
FIG. 8 is a perspective view of a second modified fishing lure holder apparatus.

A fishing lure holder apparatus 20 (FIG. 1) is adapted for attachment to an inside generally-vertical surface of a fishing boat hull, console, or seat in an easy-to-reach location. The apparatus 20 includes an elongated frame 21 that is about 12 to 14 inches long, with first and second flanges 22 and 23 forming an L-shaped cross section. The frame 21 can be molded of a structural plastic, metal or other material suitable for damp/fishing environments, such as PVC, Nylon, other plastic, composite, metal or other material. The first flange 22 extends vertically about 1 to 2 inches (more preferably 1 to 1¼ inches) and is adapted for attachment to the vertical surface. The second flange 23 extends generally horizontally about 1 to 2 inches (more preferably 1 to 1¼ inches) when the frame 21 is mounted to the vertical surface. The fishing lure holder apparatus 20 includes spaced-apart magnetic holders 24 (magnets) positioned in (or embedded in such as by insert molding or friction-fitted into receiving pockets) the first and second flanges 22, 23 at strategic locations. The magnetic holders 24 generate a magnetic field below the second flange 23 for magnetically retaining magnetically-responsive hooks 25 of fishing lures 26 with a remainder body 27 of the fishing lures 26 hanging downward. The illustrated magnetic holders 24 also generate a magnetic field above the flange 23 for magnetically retaining fishing hooks 28 on top of the flange 23.

Two magnetic holders 24 are positioned above each other in flange 23 adjacent a cutout in (or off an end of) the vertical flange 22. These magnetic holders 24 generate a magnetic field in a sideways direction for magnetically retaining a fishing pliers tool 29. The apparatus 20 also includes arrow-shaped apertures/holes 30 which act as markers for indicating a position of the magnetic holders 24, since the illustrated magnetic holders 24 are embedded and thus hidden from view. (Notably, it is contemplated that the frame 21 can be made of translucent or transparent material, such that the magnets would be visible or at least their location detectable.) The apertures/holes 30 are positioned near an edge of the flange 23 so that non-ferrous hooks 31, which are non-responsive to magnetic fields, can be placed into the holes 30 of the holder apparatus 20.

The magnetic holders 24 are preferably Neodymium, a rare earth magnet having good strength. These magnets can be purchased in commerce, such as from K&J Magnetics at www.kjmagnetics.com.

A container 32 is provided for holding non-magnetic fishing items on an apparatus as defined above, such as lead weights 33. The container 32 has a magnetically-responsive top 34 for magnetic attachment to one of the magnetic holders 24. The illustrated top 34 has an opening 35, such that the container 32 can be inverted and shaken like a salt shaker to remove a lead weight 33 for use. The top 34 may or may not be made removable.

In regard to the spaced-apart magnetic holders 24, the holders 24 are positioned in the horizontal flange 23 in an embedded location where they generate magnetic fields below the horizontal flange for magnetically retaining magnetically-responsive hooks 25 of first fishing lures 26 with a remainder of the first fishing lures 26 hanging downwardly. The magnetic holders 24 have sufficient magnetic strength to securely retain the hooks 25 even if the first fishing lures 26 are bumped or the boat shaken from waves, but the magnetic holders 24 also being configured to release an accidentally engaged one of the first fishing lures prior to the engaged hook piercing into a fisherman or his clothing. Arrow-shaped apertures 30 are formed in the second flange 23. The apertures 30 are positioned to engage hooks 31 of second fishing lures 26 (such as lures having hooks that are non-magnetically-responsive). The apertures 30 also indicate a general position of the magnetic holders 24, making it much easier to place the hooks 28 of lures 26 at locations where the hooks 28 immediately "bond" to the magnetic holders 24. Notably, the magnetic holders 24 generate a magnetic field above the flange 23 as well as below. This allows hooks 28 to be laid on the flange 23 in a magnetically retained position.

As illustrated, the second flange 23 ends short of the first (vertical) flange 22 to define an extended portion. Two magnetic holders 24 are positioned in the extended portion, one above the other. The magnetic holders 24 are sufficiently strong to magnetically hold a fisherman's tool 29 (such as a pliers tool for removing hooks or other tool, or for holding additional hooks) against the extended portion of the flange 22, in a position tight against the first flange 22 where it is not likely to be knocked off.

The illustrated flange 22 (FIG. 1) includes holes 40 for mounting screws to attach the holder apparatus 20 to the boat supporting structure. However, where the supporting structure is sufficiently flat, suction cups 41 (FIG. 6) can be attached to the holes 40 so that attachment is by vacuum rather than by a screw which would leave a mark on the supporting structure. Three such suction cups 41 are shown, but of course more or less can be used.

FIG. 8 illustrates another holder 20A where only flange 22A is provided. Several magnet holders 24A are positioned along the flange 22A. It is contemplated that the magnetic holders 24A can magnetically attach the holder 20A to a boat hull or boat supporting structure (i.e., seat, console, or the like). The magnetic holders 24A are positioned so that a pair of magnetic holders 24A can magnetically bond to and hold adjacent hooks 25A of treble-hook lures 26A. Notably, one magnetic holder 24A can magnetically attract hooks 25A of two different lures 26A, as shown in FIG. 8.

To summarize, a fishing lure holder apparatus 20 adapted for attachment to a vertical surface of a fishing boat hull, console, or seat, includes an elongated frame 21 with first and second flanges 22, 23, one of the first and second flanges 22, 23 extending vertically and being adapted for attachment to the vertical surface, and another of the first and second flanges 22, 23 extending generally horizontally when the frame 21 is mounted to the vertical surface. The fishing lure holder 20 also includes spaced-apart magnetic holders 24 positioned in the first and second flanges 22, 23. Several of the magnetic holders 24 generate a magnetic field therebelow for magnetically retaining magnetically-responsive hooks 25 of first fishing lures 26 with a remainder of the first fishing lures 26 hanging downward, and at least one of the magnetic holders 24 also generates a magnetic field thereabove for magnetically retaining fishing hooks 28 thereon, and at least one magnetic holder 24 also generates a magnetic field sidewardly for magnetically retaining a fishing pliers tool 29. The apparatus also includes markers indicating a position of the magnetic holders 24.

A container 32 is provided for holding non-magnetic fishing items on the apparatus 20 discussed above. The container 32 has a magnetically-responsive top 34 for magnetic attachment to one of the magnetic holders 24, one of the container 32 and top 34 having an opening 35 for removing selected ones of the non-magnetic fishing items.

A fishing lure holder apparatus 20 for attachment to a boat hull includes an elongated frame with a cross section defining at least one first member adapted for attachment to a boat and a horizontal flange 23 extending generally horizontally when the frame 21 is mounted to the boat hull. The apparatus 20 also includes spaced-apart magnetic holders 24 positioned in the horizontal flange 23 that generate magnetic fields below the horizontal flange 23 for magnetically retaining magnetically-responsive hooks 25 of first fishing lures 26 with a remainder of the first fishing lures 26 hanging downwardly. The magnetic holders 24 have sufficient magnetic strength to securely retain the hooks 25 even if the first fishing lures 26 are bumped or the boat shaken from waves, but the magnetic holders 24 also are configured to release an accidentally engaged one of the first fishing lures 26 prior to the engaged hook piercing into a fisherman or his clothing. Apertures 30 are located in the second flange 23 for both engaging hooks 28 of second fishing lures 26 to hold the second fishing lures 26, and also for indicating a general position of the magnetic holders 24.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A fishing lure holder apparatus adapted for attachment to a vertical surface of a fishing boat hull, console, or seat, comprising:

an elongated frame with first and second flanges, one of the first and second flanges extending vertically and being adapted for attachment to the vertical surface, and another of the first and second flanges extending generally horizontally when the frame is mounted to the vertical surface;

spaced-apart magnetic holders positioned in the first and second flanges, several of the magnetic holders generating a magnetic field therebelow for magnetically retaining magnetically-responsive hooks of first fishing lures with a remainder of the first fishing lures hanging downward, and at least one of the magnetic holders also generating a magnetic field thereabove for magnetically retaining fishing hooks thereon, and at least one magnetic holder also generating a magnetic field facing sideways for magnetically retaining a fishing tool; and markers indicating a position of the magnetic holders.

2. The fishing lure holder apparatus defined in claim 1, including a container for holding non-magnetic fishing items, the container having a magnetically-responsive top for magnetic attachment to one of the magnetic holders, one of the container and top having an opening for removing selected ones of the non-magnetic fishing items.

3. A fishing lure holder apparatus for attachment to a boat hull, comprising:

an elongated frame with a cross section defining at least one first member adapted for attachment to a boat and a horizontal flange extending generally horizontally when the frame is mounted to the boat hull;

spaced-apart magnetic holders positioned in the horizontal flange that generate magnetic fields below the horizontal flange for magnetically retaining magnetically-responsive hooks of first fishing lures with a remainder of the first fishing lures hanging downwardly; the magnetic holders having sufficient magnetic strength to securely retain the hooks even if the first fishing lures are bumped or the boat shaken from waves, but the magnetic holders also being configured to release an accidentally engaged one of the first fishing lures prior to the engaged hook piercing into a fisherman or his clothing; and apertures in the second flange for both engaging hooks of second fishing lures and also for indicating a general position of the magnetic holders.

4. The fishing lure holder apparatus defined in claim 3, including a container for holding non-magnetic fishing items, the container having a magnetically-responsive top for magnetic attachment to one of the magnetic holders, one of the container and top having an opening for removing selected ones of the non-magnetic fishing items.

5. The fishing lure holder apparatus defined in claim 4, wherein at least one of the magnetic holders generates a magnetic field thereabove for magnetically retaining fishing hooks thereon.

6. The fishing lure holder apparatus defined in claim 5, wherein at least one magnetic holder generates a magnetic field sidewardly for magnetically retaining a fishing pliers tool.

7. The fishing lure holder apparatus defined in claim 6, including markers indicating a position of the magnetic holders.

8. The fishing lure holder apparatus defined in claim 7, wherein the markers include at least some of the apertures in the first flange.

9. The fishing lure holder apparatus defined in claim 3, wherein at least one of the magnetic holders generates a magnetic field thereabove for magnetically retaining fishing hooks thereon.

10. The fishing lure holder apparatus defined in claim 3, wherein at least one magnetic holder generates a magnetic field sidewardly for magnetically retaining a fishing pliers tool.

11. The fishing lure holder apparatus defined in claim 3, including markers indicating a position of the magnetic holders.

12. The fishing lure holder apparatus defined in claim 3, wherein the markers include at least some of the apertures in the first flange.

* * * * *